(12) United States Patent
Nilsson et al.

(10) Patent No.: US 12,145,427 B2
(45) Date of Patent: Nov. 19, 2024

(54) VEHICLE AIR FEEDING SYSTEM AND CORRESPONDING METHOD

(71) Applicant: Ningbo Geely Automobile Research & Development Co., Ltd., Ningbo (CN)

(72) Inventors: Magnus Nilsson, Floda (SE); Yijun Zheng, Västra Frölunda (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 319 days.

(21) Appl. No.: 17/673,366

(22) Filed: Feb. 16, 2022

(65) Prior Publication Data

US 2022/0169095 A1 Jun. 2, 2022

Related U.S. Application Data

(63) Continuation of application No. PCT/CN2020/114077, filed on Sep. 8, 2020.

(30) Foreign Application Priority Data

Sep. 16, 2019 (EP) .................................... 19197545

(51) Int. Cl.
  *B60H 3/00* (2006.01)
  *B60H 1/24* (2006.01)
  *B60H 1/26* (2006.01)
(52) U.S. Cl.
  CPC .......... *B60H 3/0035* (2013.01); *B60H 1/242* (2013.01); *B60H 1/26* (2013.01); *B60H 2003/0042* (2013.01)

(58) Field of Classification Search
  CPC ........ B60H 3/0035; B60H 1/242; B60H 1/26; B60H 2003/0042; B60H 2003/0064
  See application file for complete search history.

(56) References Cited

U.S. PATENT DOCUMENTS

| | | | |
|---|---|---|---|
| 2,554,764 A | 5/1951 | Wilkerson | |
| 2,984,415 A * | 5/1961 | Wilfert .................. | B60H 1/247 237/12.3 A |
| 3,096,938 A | 7/1963 | Cole | |
| 3,282,505 A | 11/1966 | Harter | |

(Continued)

FOREIGN PATENT DOCUMENTS

| | | |
|---|---|---|
| CN | 101402311 A | 4/2009 |
| CN | 102294946 A | 12/2011 |

(Continued)

OTHER PUBLICATIONS

International Search Report from corresponding International Application No. PCT/CN2020/114077, mailed on Nov. 26, 2020, 2 pages.

*Primary Examiner* — Jessica Yuen
(74) *Attorney, Agent, or Firm* — Tucker Ellis LLP

(57) ABSTRACT

A vehicle air feeding system for introducing air with smell associated with a component of a vehicle powertrain into a vehicle passenger compartment. The air feeding system includes an air inlet located adjacent the component of the powertrain, an air outlet located in the vehicle passenger compartment, and an air duct arrangement providing a flow path from the air inlet to the air outlet and configured for guiding air with smell associated with the component of the vehicle powertrain from the air inlet to the air outlet.

14 Claims, 6 Drawing Sheets

(56) References Cited

U.S. PATENT DOCUMENTS

| | | | |
|---|---|---|---|
| 3,525,853 A | 8/1970 | Nilssen | |
| 3,908,900 A * | 9/1975 | Smith | B60H 1/16 237/12.3 A |
| 2011/0216916 A1 | 9/2011 | Hera | |
| 2015/0092957 A1 | 4/2015 | Osawa | |
| 2018/0134112 A1 | 5/2018 | Seiferlein | |
| 2018/0312039 A1 | 11/2018 | Sakane | |

FOREIGN PATENT DOCUMENTS

| | | | |
|---|---|---|---|
| CN | 103921649 A | 7/2014 |
| CN | 206378954 U | 8/2017 |
| CN | 108698701 A | 10/2018 |
| DE | 102015221627 A1 | 5/2017 |

\* cited by examiner

VEHICLE AIR FEEDING SYSTEM AND CORRESPONDING METHOD

RELATED APPLICATION DATA

This application is a continuation of International Patent Application No. PCT/CN2020/114077, filed Sep. 8, 2020, which claims the benefit of European Patent Application No. 19197545.7, filed Sep. 16, 2019, the disclosures of which are incorporated herein by reference in their entireties.

TECHNICAL FIELD

The disclosure relates to vehicle air feeding system and method for introducing air with smell associated with a component of a vehicle powertrain into a vehicle passenger compartment.

Although the disclosure will be described primarily in relation to a car, the disclosure is not restricted to this type of vehicle, but may alternatively be installed in other type of vehicles such as off-road vehicles, construction machines such as wheel loaders or excavators, trucks, buses, marine vessels, aircrafts, or the like.

BACKGROUND

Modern vehicles, such as cars, generally provide a very comfortable ride with comfortable wheel suspension, low noise levels and air conditioned and tempered compartment air. These improvements in driving comfort, which are desired by most vehicle drivers and passengers, generally also result in that the driver experiences a more isolated and remote feeling with respect to the powertrain, specifically the engine, and the driver may no longer to the same extent as before intuitively experience the operating state and load level of the powertrain.

There is thus a demand for enabling the vehicle driver to more intuitively experience the operating state and load level of at least a part of the powertrain, and thereby also experience a greater emotional feeling of contact with the powertrain.

SUMMARY

This section provides a general summary of the disclosure, and is not a comprehensive disclosure of its full scope or all of its features.

A general object of the present disclosure is to enable the vehicle driver to more intuitively experience the operating state and load level of at least a part of the powertrain.

This and other objects, which will become apparent in the following, are accomplished by a system and method as defined in the accompanying independent claim(s).

According to a first aspect of the present disclosure, there is provided a vehicle air feeding system for introducing air with smell associated with a component of a vehicle powertrain into a vehicle passenger compartment, The vehicle air feeding system comprises an air inlet located adjacent the component of the powertrain, an air outlet located in the vehicle passenger compartment, and an air duct arrangement providing a flow path from the air inlet to the air outlet and configured for guiding air with smell associated with the component of the vehicle powertrain from the air inlet to the air outlet.

According to a second aspect of the present disclosure, there is provided a method for introducing air with smell associated with a component of a vehicle powertrain into a vehicle passenger compartment. The method comprises providing an air duct arrangement having an air inlet located adjacent the component of the powertrain and an air outlet located in the vehicle passenger compartment, and guiding air with smell associated with the component of the vehicle powertrain from the air inlet to the air outlet.

The smell of the air located adjacent a component of the powertrain, in particular components of the powertrain that tend to be warm or hot during vehicle driving, such as for example the exhaust system or engine block, typically changes significantly with operating state and operating load of the powertrain. For example, inspired driving with high engine load typically results in high operating temperature of at least parts of the powertrain, and smells associated with high temperature powertrain components may be supplied to the driver for enabling the driver to automatically and intuitively experience the powertrain operating state and load. During gentler driving other types of powertrain smell is emitted.

Consequently, by guiding air from an air inlet located adjacent the component of the powertrain to an air outlet located in the vehicle passenger compartment, air with smell from the said powertrain component may be fed to the driver, such that the vehicle driver more intuitively can experience the operating state and load level of at least a part of the powertrain.

Further advantages are achieved by implementing one or several of the features of the dependent claims.

In one example embodiment, the air feeding system further comprises an air duct valve for enabling selective opening and closing of the flow path. Thereby the driver or an electronic controller may selectively open and close the flow path for only feeding air with smell from a powertrain component when desired or deemed appropriate.

In a further example embodiment, the air feeding system further comprises a fan mounted within the flow path for enabling forced airflow from the air inlet to the air outlet. Thereby a more reliable feeding of air from the air inlet to the air outlet is accomplished.

In still a further example embodiment, the air feeding system comprises a left side air outlet located adjacent a left side of the vehicle passenger compartment, and a right side air outlet located adjacent a right side of the vehicle passenger compartment, wherein flow path includes a left side flow path from the air inlet to the left side air outlet and a right side flow path from the air inlet to the right side air outlet. Thereby, a better distribution of the air with smell from the powertrain component may be accomplished in the passenger compartment.

In another example embodiment, the air feeding system further comprises a valve arrangement for enabling selective individual opening and closing of the left side flow path and the right side flow path. This allows individual control of the amount of air feeding to the driver and passenger, respectively.

In still another example embodiment, the air feeding system further comprises an electronic controller for controlling an airflow through the flow path, and an air quality sensor located within the passenger compartment or within the flow path or adjacent the air inlet, and wherein the electronic controller is configured to prevent airflow through the flow path when the air quality, as detected by the air quality sensor, is below a threshold value. Thereby, feeding of air from the powertrain component may be automatically stopped in case of too low air quality.

In one example embodiment, the air feeding system further comprises a fresh air inlet for sucking fresh exterior air into the air feeding system, and a HVAC unit with a fan located in a fresh airflow path extending between the fresh air inlet and the air outlet, wherein the air duct arrangement includes a pipe segment extending between the air inlet and a low pressure region of the fresh airflow path located upstream of the fan and configured for sucking air with smell associated with the component of the vehicle powertrain from the air inlet into the HVAC unit and further to the air outlet. Thereby, the cost for implementation of the air feeding system may held low, because the air feeding system and HVAC system may share a common fan and common air duct arrangement.

In another example embodiment, the air duct arrangement further comprises a fresh air branch point located upstream of the fan in the fresh airflow path and dividing the fresh airflow path into a left side fresh airflow path extending between the fresh air branch point and left side air outlet and a right side fresh airflow path extending between the fresh air branch point and right side air outlet, wherein the pipe segment configured for sucking air with smell associated with the component of the vehicle powertrain from the air inlet into the HVAC unit includes a left side pipe segment connected to the left side fresh airflow path, a right side pipe segment connected to the right side fresh airflow path, and a valve arrangement for controlling flow of air from the air inlet to each of the left side fresh airflow path and right side fresh airflow path via said left and right side pipe segment, respectively. Thereby, the cost for implementation of the air feeding system may held low, because the air feeding system and HVAC system may share a common fan and common air duct arrangement, while still allowing individual control of temperature and air feeding from the powertrain component by the driver and passenger.

In one example embodiment, the component of the vehicle powertrain is a combustion engine exhaust manifold, a combustion engine exhaust system, an exhaust system catalytic converter, an exhaust muffler, a combustion engine super charger, a combustion engine turbo charger, a friction clutch, an engine block, an electric propulsion motor, or a high-voltage propulsion battery pack. These components typically become hotter upon load and may therefore be suitable as source for air smell indicating powertrain load condition.

In one example embodiment, the component of the vehicle powertrain is a hot component during operation of the powertrain. Since a warm component generally release more odour molecules than to cold component, a component that is hot during operation of the powertrain may generally be deemed suitable as source for air smell indicating powertrain load condition.

In one example embodiment, the air inlet is located less than 40 cm, specifically less than 10 cm, from the component of the powertrain, and without any partition or shielding wall between the air inlet and the component of the powertrain. The air inlet must typically be located relatively close to the component for sucking in a sufficiently high concentration of odour molecules released by said specific component to be detectable by the receptors of the human nose.

In one example embodiment, the air feeding system further comprises an electronic controller for controlling an airflow through the flow path, wherein the electronic controller is configured for obtaining vehicle speed and automatically generating airflow from air inlet to air outlet when speed is larger than threshold value, providing time-varying spiritual driving index and automatically generating airflow from air inlet to air outlet when the spiritual driving index is larger than a threshold value, detecting vehicle driving mode and automatically generating airflow from air inlet to air outlet when a vehicle sport mode or vehicle race mode is selected, or obtaining a twisty road index associated with the current road and current location of the vehicle and automatically generating airflow from air inlet to air outlet when the twisty road index is larger than a threshold value. Automatic activation of the air feeding system during certain specific driving conditions may be beneficial in that the driver does not need to remember manual activation and deactivation of the air feeding system.

In one example embodiment, the air inlet is located in a vehicle engine bay. This located generally includes a large portion of the powertrain components that become hot during operation of the vehicle.

The disclosure also relates to a vehicle comprising a vehicle air feeding system as described above.

Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION

Figure 1:
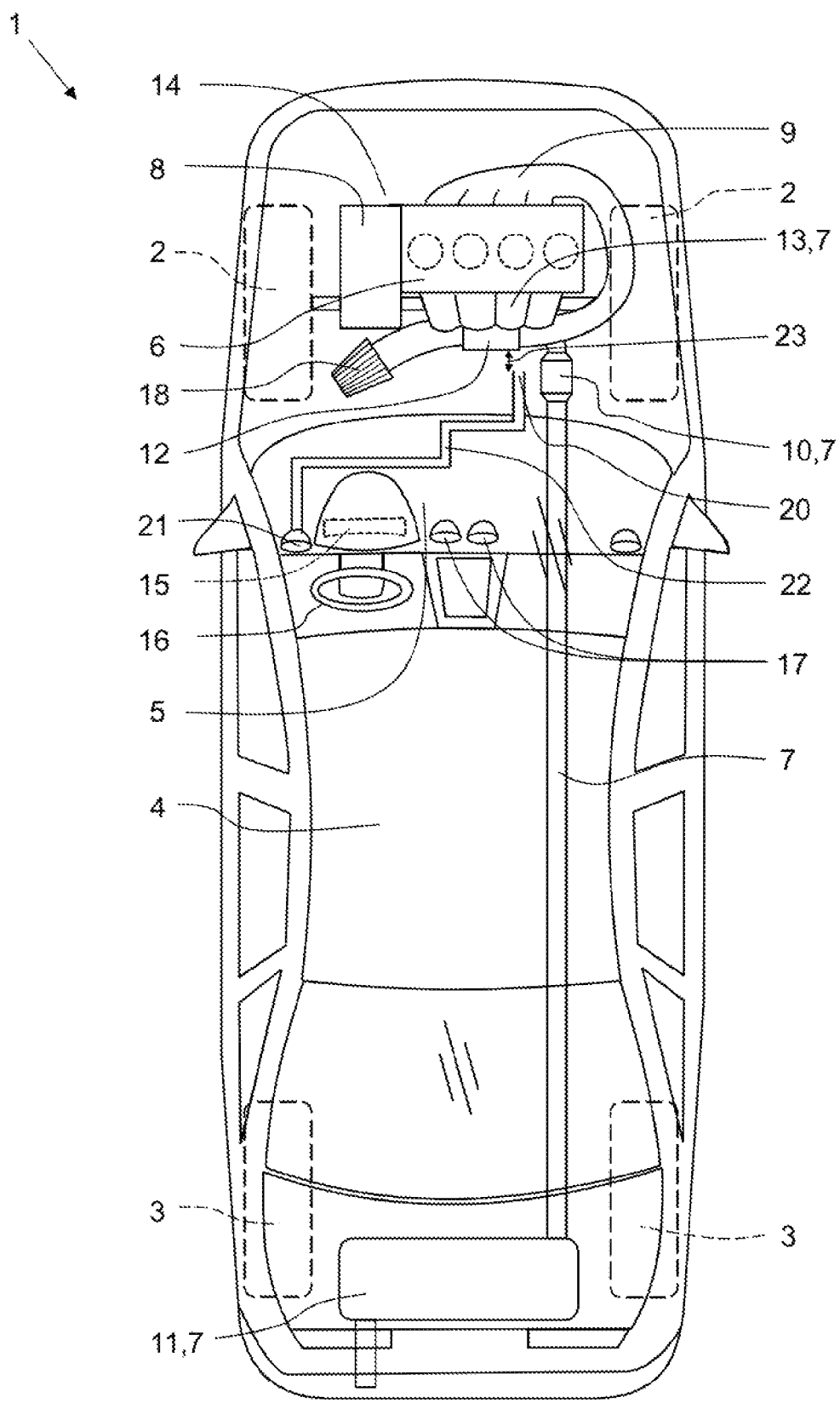
FIG. 1 is a schematic top view of a vehicle having an example embodiment of the air feeding system implemented therein.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to FIG. 1, there is schematically depicted a top view of a vehicle 1 in form of a car having front wheels 2, rear wheels 3, passenger compartment 4 with dashboard 5, powertrain including a combustion engine 6 with air inlet filter 18 and air inlet manifold 9, exhaust manifold 13, exhaust system 7, catalytic converter 10, exhaust muffler 11, turbo charger 12, and transmission unit 8.

The combustion engine 6 is located in an engine bay 14 of the vehicle 1. Furthermore, the dashboard 5 typically includes instrument panel 15, steering wheel 16, and air feeding outlets 17.

FIG. 1 schematically shows a first example embodiment of the vehicle air feeding system for introducing air with smell associated with a component of a vehicle powertrain into a vehicle passenger compartment 4. The vehicle air feeding system is here illustrated implemented in a vehicle 1.

The vehicle air feeding system comprises an air inlet 20 located adjacent the component of the powertrain, an air outlet 21 located in the vehicle passenger compartment 4, and an air duct arrangement 22 providing a flow path from the air inlet 20 to the air outlet 21 and configured for guiding air with smell associated with the component of the vehicle powertrain from the air inlet 20 to the air outlet 21.

The air duct arrangement 22 may for example have an inner dimension or diameter in the range of about 5-100 mm, specifically about 10-50 mm.

Said component of the vehicle powertrain is for example the combustion engine exhaust manifold 13, the combustion engine exhaust system 7, the exhaust system catalytic converter 10, the exhaust muffler 11, the combustion engine turbo charger 12, a combustion engine super charger (not showed), a friction clutch (not showed), the transmission unit 8, the engine block 6.

When the air feeding system is implemented in a hybrid electric, a battery electric or hydrogen powered vehicle, said component of the vehicle powertrain is for example, an electric propulsion motor (not showed) or a high-voltage propulsion electrical storage system (not showed), such as a battery pack and/or one or more super capacitors.

Specifically, said components of the vehicle powertrain are component examples that may become hot during operation of the powertrain. A vehicle powertrain component that becomes hot during vehicle driving generally generate different smells when cold and hot, for example because heat causes more odour molecules to liberate from a surface of the component and become airborne, thereby enabling a higher concentration of odour molecules to reach and become detected by the odour receptors in the nose of the driver, such that the driver more intuitively can derive current operating status and load of the powertrain merely be receiving smell associated with said component, because smell of a hot powertrain component may be a strong indicator of large load.

Likewise, the smell of friction wear of clutch friction plates may sometimes be a strong indication of gear engagement during large engine torque.

The air duct arrangement 22 is for example made of a single pipe, tube or duct that guides and conveys the air from the air inlet 20 to the air outlet 21. Alternatively, the air duct arrangement 22 may be composed of many different pipe and/or duct segments that are assembled into the air duct arrangement 22.

Figure 8:
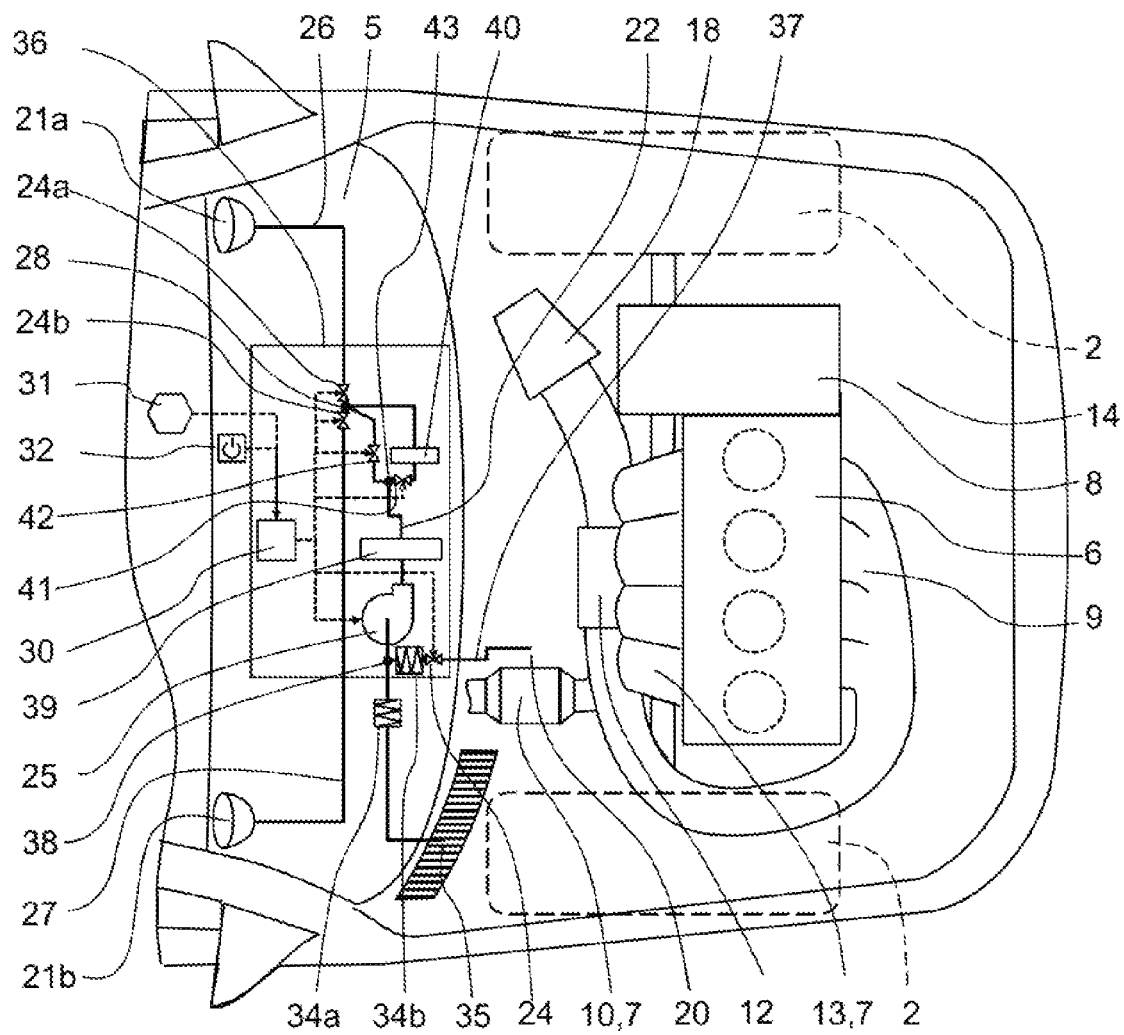
FIG. 8 shows a further schematic top view of a front part of the vehicle including another example embodiment of the air feeding system, here integrated with a HVAC system.

Moreover, the air duct arrangement 22 may be specifically and uniquely provided merely for supply of air with powertrain smell into the passenger compartment 4, as schematically illustrated in FIG. 1, or the air duct arrangement 22 may be implemented as a part of the ducts arrangement of a conventional vehicle Heating Air feeding Air Conditioning (HVAC) system, as schematically illustrated in FIG. 8, which will be described more in detail later.

The air inlet 20 is for example merely an opening of a pipe or tube or duct. Alternatively, the air inlet may be located in a nozzle or the like that is attached to the air duct arrangement 22.

The air outlet 21 may be located at a clearly visible location in the vehicle passenger compartment 4, and may for example have the form of a conventional dashboard air-feeding outlet.

Alternatively, the air outlet 21 may be located at a more or less hidden location, such as under the steering wheel or adjacent the accelerator pedal, or the like.

Furthermore, the air outlet 21 may be specifically provided merely for supplying the air with smell associated with a component of a vehicle powertrain into a vehicle passenger compartment 4. Alternatively, the air outlet 21 may be integrated into a conventional fresh air feeding system, e.g. a HVAC system, of the vehicle that supplies ambient air into the passenger compartment 4, for example via one or more conventional dashboard ventilation outlets. In such an arrangement, one or more of the conventional dashboard ventilation outlets 17 may be used for supplying both fresh ambient air and air with smell associated with a component of a vehicle powertrain into a vehicle passenger compartment 4.

The air inlet 20 is typically located outside of said powertrain component, and spaced apart from said component with a certain distance 23, as schematically illustrated in FIG. 1. According to one example embodiment, the air inlet 20 may be located less than 40 cm, specifically less than 10 cm, from said component of the powertrain, and without any partition or shielding wall between the air inlet 20 and the component of the powertrain.

In other words, airflow that has passed closed to the component of the powertrain and thereby received odour molecules associated with a certain smell may easily and without barriers flow from the component to the air inlet 20 and bring along airborne odour molecules.

As illustrated in FIG. 1, the air inlet 20 may be located at an appropriate location within the vehicle engine bay 14. Thereby, air with airborne odour molecules associated with a powertrain component may be easily and efficiently sucked into the air inlet 20.

Figure 2:
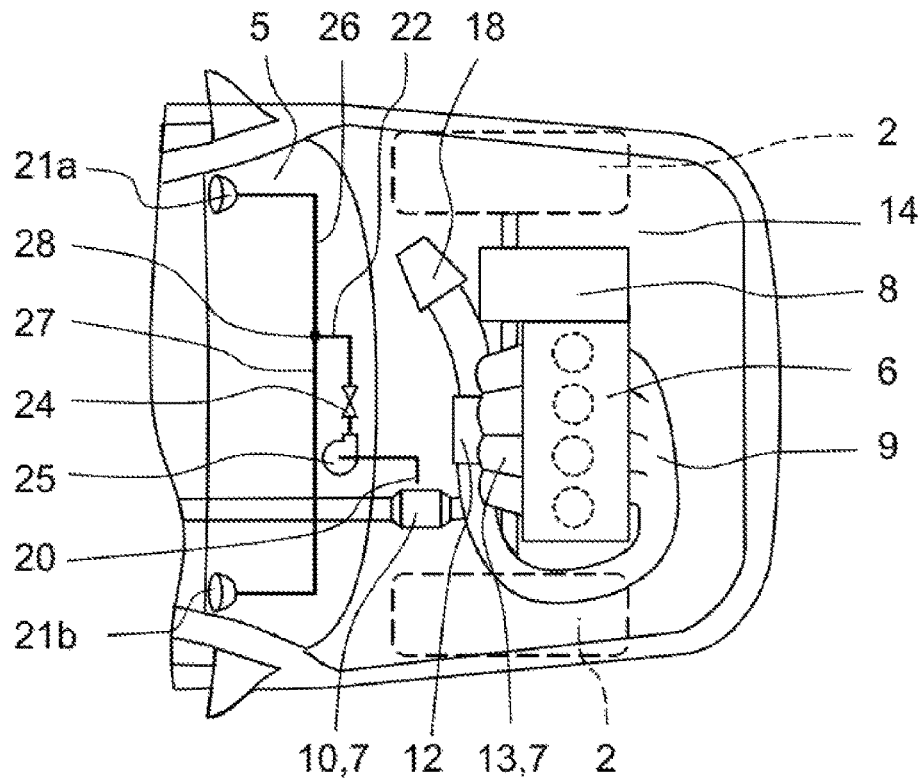
FIG. 2 is a schematic top view of a front part of the vehicle showing another example embodiment of the air feeding system.

With reference to FIG. 2, the air feeding system may further comprise an air duct valve 24 for enabling selective opening and closing of the flow path extending from the air inlet 20 to the air outlet 21. This may be desirable for enabling the driver to control the level of powertrain smell that is supplied to the passenger compartment 4, in according with the driver's current mood and desire. In other words, if the driver wants to intuitively and more closely experience the real operating state and load level of at least a part of the powertrain the driver may simply decide to open the air duct valve 24 and enable airflow from the air inlet 20 to the air outlet 21, and if the driver wants to stop said intuitive and close experience the driver may simply decide to close the air duct valve 24 and enable airflow from the air inlet 20 to the air outlet 21. The driver may also control the amount of powertrain smell by controlling the opening degree of the valve element of the air duct valve 24.

The air duct valve 24 may be any type of valve suitable for controlling opening and closing of an air duct, such as for example a shutter valve, butterfly valve, gate valve, ball valve, etc. The air duct valve 24 is mounted in a pipe segment of the air duct arrangement 22.

Moreover, the operating state of the air duct valve 24 is controllable by the driver and/or an electronic controller. For example, the driver may have access to a manual actuator within the passenger compartment 4, which actuator is mechanically connected to the valve element of the air duct valve 24, for enabling the driver to manually control the operating state of the valve element, i.e. to open and close the air duct valve 24. Alternatively, the valve element of the air duct valve 24 may be controlled by a servomotor or the like, and the driver or electronic controller may control the operating state of the valve element via the servo motor.

With reference again to FIG. 2, the air feeding system may further comprise a fan 25 mounted within the flow path for enabling forced airflow from the air inlet 20 to the air outlet 21. This may be desirable for enabling the driver to better control the level of powertrain smell that is supplied to the passenger compartment 4, in according with the driver's current mood and desire. In other words, if the driver wants to intuitively and more closely experience the real operating state and load level of at least a part of the powertrain the driver may simply decide to switch on the fan 25 and enable increased airflow from the air inlet 20 to the air outlet 21, and oppositely.

The fan is typically electrically powered and may be of any type suitable for air ventilation, such as a centrifugal fan or an axial fan. The operation of the air feeding 25 may be manually controlled by the driver via a suitable control interface and/or and automatically by an electronic controller.

With reference again to FIG. 2, the air feeding system may further comprise a left side air outlet 21a located adjacent a left side of the vehicle passenger compartment 4, and a right side air outlet 21b located adjacent a right side of the vehicle passenger compartment 4, wherein the flow path includes a left side flow path 26 from the air inlet 20 to the left side air outlet 21a and a right side flow path 27 from the air inlet 20 to the right side air outlet 21b. Thereby, the air with smell from a powertrain component may be better guided to both the left and right side of the passenger compartment 4.

Specifically, the air duct arrangement 22, which provides the flow path from the air inlet 20 to the air outlets 21a, 21b, may include a first branch point 28 at which the flow path is divided into said left side flow path 26 and right side flow path 27. Moreover, by having the air duct valve 24 and/or the fan 25 located in the flow path extending from the air inlet 20 to the first branch point 28, the operation of the air feeding system may be controlled by a single air duct valve 24 and/or a single fan 25.

As described above, the air inlet 20 may in certain example embodiments be located close to a specific powertrain component whose smell should be supplied to the passage compartment 4. For example, as schematically illustrated in FIG. 2, the air inlet 20 may be located relatively close to an exterior surface of the catalytic converter 10 for better catching odour molecules released from the catalytic converter 10, specifically from the exterior surface of the catalytic converter. The air inlet 20 may for example be located less than 40 cm, specifically less than 10 cm, from the catalytic converter.

Figure 3:
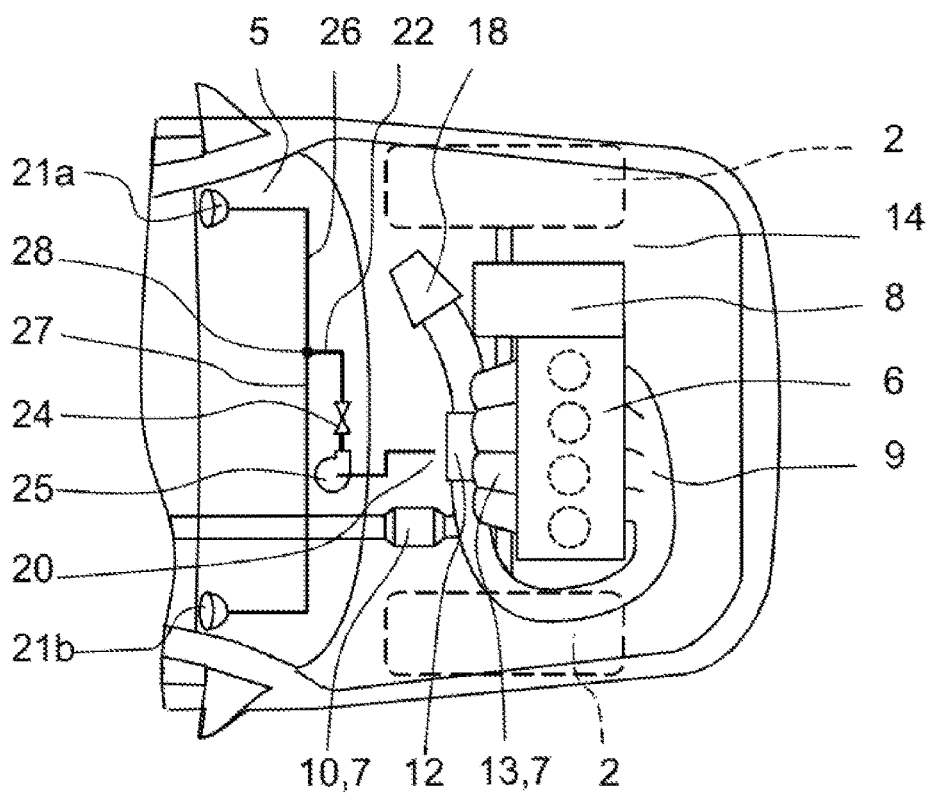
FIGS. 3-5 show, each, a schematic top view of a front part of the vehicle including a specific example embodiment of the air feeding system.

Alternatively, as schematically illustrated in FIG. 3, the air inlet 20 may be located relatively close to an exterior surface of the combustion engine turbo charger 12 for better catching odour molecules released from the turbo charger 12, specifically from the exterior surface of the turbo charger 12. The air inlet 20 may for example be located less than 40 cm, specifically less than 10 cm, from the turbo charger 12.

Figure 4:
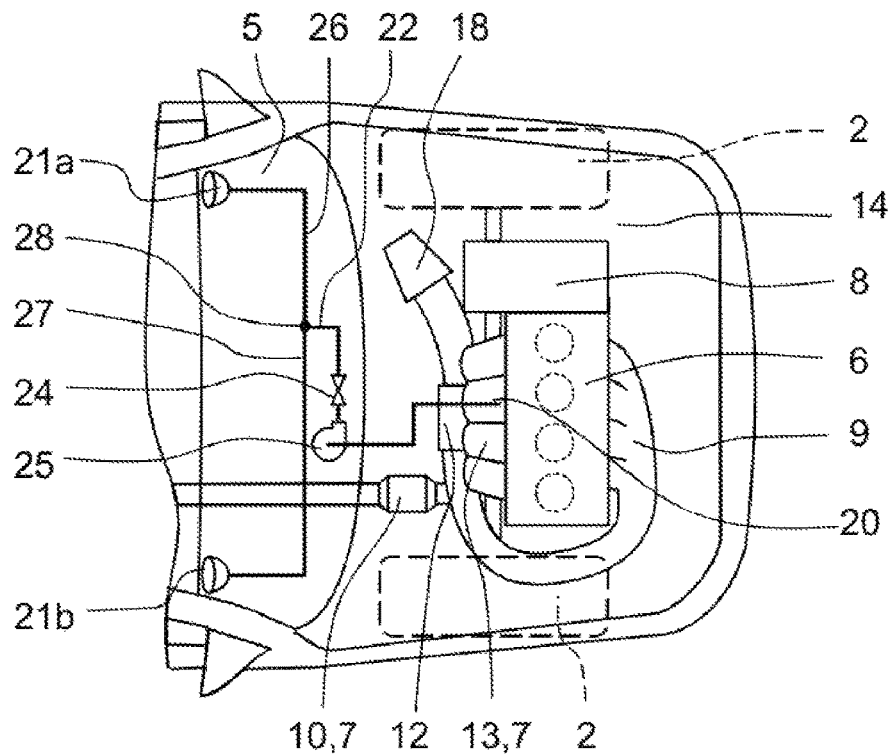

Alternatively, as schematically illustrated in FIG. 4, the air inlet 20 may be located relatively close to an exterior surface of the combustion engine exhaust manifold 13 for better catching odour molecules released from the exhaust manifold 13, specifically from the exterior surface of the exhaust manifold 13. The air inlet 20 may for example be located less than 40 cm, specifically less than 10 cm, from the exhaust manifold 13.

Figure 5:
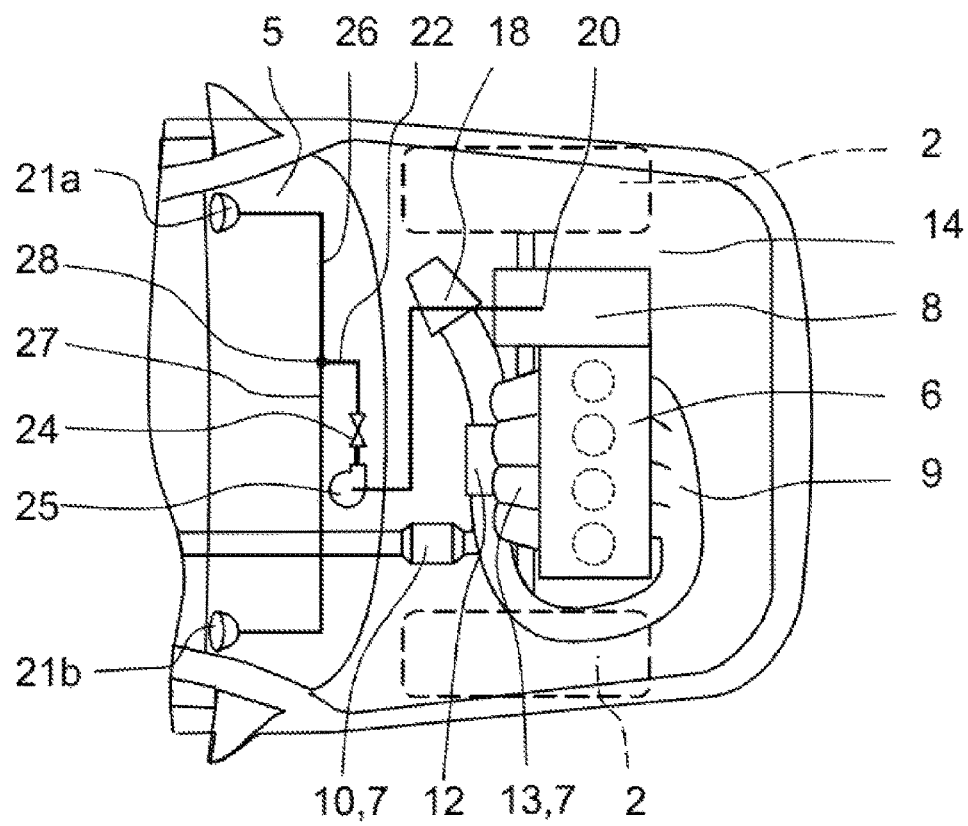

Alternatively, as schematically illustrated in FIG. 5, the air inlet 20 may be located relatively close to an exterior surface of the transmission unit 8 for better catching odour molecules released from the transmission unit 8, specifically from the exterior surface of the transmission unit 8. The air inlet 20 may for example be located less than 40 cm, specifically less than 10 cm, from the transmission unit 8.

Figure 6:
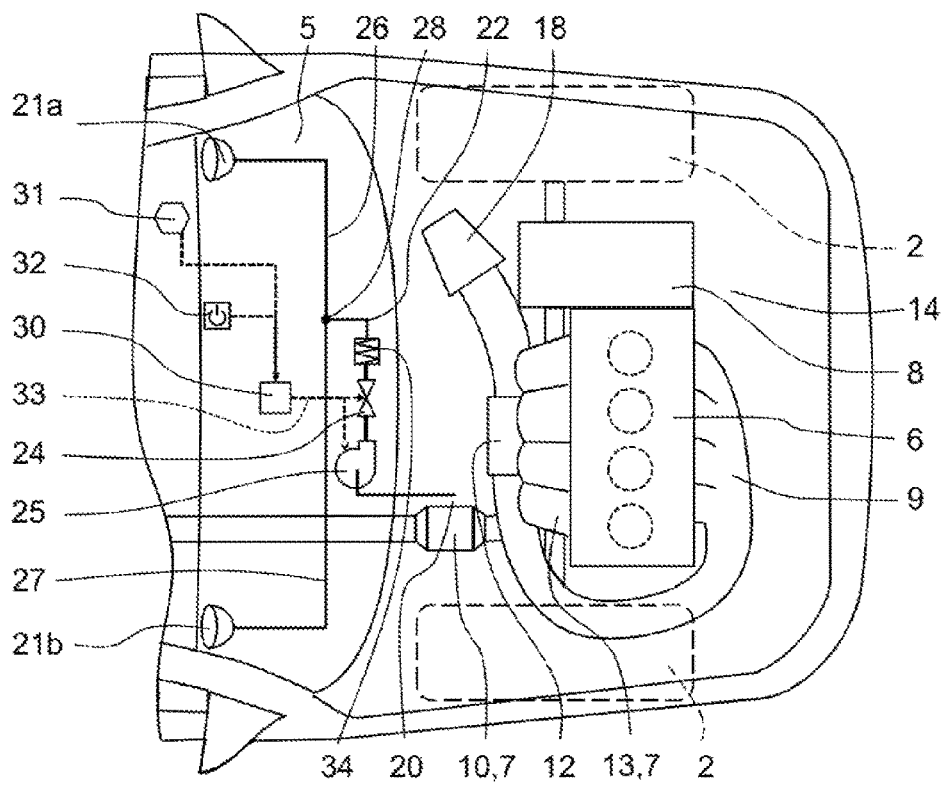
FIG. 6 shows a schematic top view of a front part of the vehicle including still a further example embodiment of the air feeding system including an electronic controller.

With reference to FIG. 6, the air feeding system may according to an example embodiment further comprise an electronic controller 30 for controlling an airflow through the flow path, and an air quality sensor 31 located within the passenger compartment 4 and wherein the electronic controller 30 is configured to prevent airflow through the flow path when the air quality, as detected by the air quality sensor 31, is below a threshold value.

Consequently, the air feeding system may be provided with some intelligence and be configured to allow supply of air with smell of a powertrain component into the passenger compartment 4 only when the air quality, as detected by the air quality sensor 31, is sufficiently clean and non-polluted to meet certain air quality criteria, which may be stored as threshold values in a memory of the electronic controller 30.

The air quality sensor 31 may alternatively be located within the flow path or adjacent the air inlet 20. Two, three or more air quality sensors may still more alternatively be provided at various locations of the vehicle, such within the passenger compartment, in front of the air outlet 21, 21a, 21b, within the flow path or adjacent the air inlet 20.

The electronic controller 30 may be configured to control the airflow through the flow path for example by controlling the operation of an air duct valve 24 and/or a fan 25 via communication lines 33, as described above with reference to FIG. 2. In other words, when the driver indicates that he or she wants supply of air from the powertrain component into the passenger compartment 4, for example by actuating a designated button 32 or via a user interface of the dashboard, the electronic controller:

either first determines current air quality of the air within the passenger compartment 4 and/or associated with the powertrain component to be supplied to the passenger compartment 4 and subsequently decides to activate an airflow from the air inlet 20 to the air outlet 21, 21a, 21b if the detected air quality is above a certain threshold value, or first activates an airflow from the air inlet 20 to the air outlet 21, 21a, 21b, and subsequently determines current air quality of the air within the passenger compartment 4 and/or associated with the powertrain component that is being supplied to the passenger compartment 4, and thereafter deciding to continue said airflow from the air inlet 20 to the air outlet 21, 21a, 21b only if the detected air quality is above a certain threshold value, and otherwise stopping said airflow.

The air quality sensor 31 may for example include particle size measurement, such that airflow through the flow path is inhibited when particles over a certain size, such as for example 2.5 microns (PM2.5) are detected by the air quality sensor. Another substance that may be monitored by the air quality sensor 31 and used for controlling the airflow from the component of the powertrain may for example hydrocarbons, such that airflow may be closed in event of detected high levels of hydrocarbon.

An air filter 34 may additionally be located in the flow path for filtering out particles or the like from the airflow. The air filter 34 may be located upstream or downstream of the fan 25.

The electronic controller 30 may further be configured for intelligent automatic activation of the air feeding system according to the disclosure when certain conditions are fulfilled, which conditions may indicate that the driver would appreciate more intuitively experiencing the operating state and load level of at least a part of the powertrain, and thereby also experience a greater emotional feeling of contact with the powertrain.

For example, the electronic controller 30 may be configured for obtaining vehicle speed and subsequently automatically generating airflow from air inlet 20 to air outlet 21, 21a, 21b when speed is larger than threshold value. The vehicle speed may be a parameter indicating spiritual driving that could motivate activation of said airflow. The vehicle speed is generally available is a control parameter in the vehicle control system based on a wheel speed sensor or via a GPS-based navigations system.

Alternatively, or in combination with above, the electronic controller 30 may be configured for providing a time-varying spiritual driving index and automatically generating airflow from air inlet 21 to air outlet 21, 21a, 21b when the spiritual driving index is larger than a threshold value. The time-varying spiritual driving index may be based on one or more factors that may be deemed indicating a spiritual driving, such as in particular high forward acceleration, high deceleration (braking), and/or high lateral acceleration (cornering). The spiritual driving index is may be more or less continuously calculated and the electronic controller 30 may then control activation and deactivation of the air feeding system by comparing the spiritual driving index with a threshold value.

Still more alternatively, or in combination with above, the electronic controller 30 may be configured for detecting vehicle driving mode and automatically generating airflow from air inlet 20 to air outlet 21, 21a, 21b when a vehicle sport mode or vehicle race mode is selected. Activation of the vehicle sport mode or vehicle race mode may be seen as an indication that the driver is would appreciate more intuitively experiencing the operating state and load level of at least a part of the powertrain. Hence, as such occasions, the electronic controller 30 may be configured for automatic activation of the airflow from air inlet 20 to air outlet 21, 21a, 21b.

Still more alternatively, or in combination with above, the electronic controller 30 may be configured for obtaining a twisty road index associated with the current road and/or current location of the vehicle and automatically generating airflow from air inlet 20 to air outlet 21, 21a, 21b when the twisty road index is larger than a threshold value. The electronic controller 30 may for example first identify the current road and/or current location of the vehicle, for example via a GPS-based navigation system, cell-phone base station triangulation, or the like, and subsequently acquire the twisty road index for the current vehicle location, for example via a remote or on-board database. Roads having many curves generally have a high twisty road index, but highways typically has a low twisty road index. After having obtained the twisty road index, the electronic controller may automatically activate said airflow from air inlet 20 to air outlet 21, 21a, 21b when the twisty road index is larger than a threshold value.

Still a further example embodiment of the air feeding system according to the disclosure is described with reference to FIG. 7, which primarily differs from the embodiment of FIG. 6 in that airflow through each of the left side flow path 26 and right side flow path 27 are individually controllable. This may for example be realized by means of a left side air duct valve 24a located in the left side flow path 26, and a right side air duct valve 24b located in the right side flow path 27.

In other words, the air feeding system comprises a left side air duct valve 24a for enabling selective opening and closing of the left side flow path, and a right side air duct valve 24b for enabling selective opening and closing of the right side flow path.

Specifically, by locating the first branch point 28 upstream of said left and right side valves 24a, 24b, but downstream of the fan 25, the operation of the air feeding system may be controlled by a single fan 25, but now requiring two air duct valves 24a, 24b.

Consequently, a driver sitting on the left side of the vehicle may control the air feeding system for supplying air with smell from the powertrain to the left side of the passenger compartment, for example via manual actuation of the designated button 32 or via a user interface of the dashboard, such that the left side valve 24a is opened and the fan 25 is switched on, while a passenger sitting next to the driver on the right side of the vehicle may control the air feeding system, for example via manual actuation of the designated button 32 or via a user interface of the dashboard, for not supplying air with smell from the powertrain to the right side of the passenger compartment 4, such that the right side valve 24a is closed.

The left and right side air duct valves 24a, 24b, which may be controlled manually or via the electronic controller 30, may be located integrated in the dashboard 5. Alternatively, the left and right side air duct valves 24a, 24b may be located integrated within the air outlets 21, 21a, 21b, and possibly manually controlled.

The left and right side valves 24a, 24b merely represent one alternative design of a valve arrangement for enabling selective individual opening and closing of the left side flow path 26 and the right side flow path 27. For example, the left and right side valves 24a, 24b and the first branch point 28 may be replaced by a single flap valve, which flap valve may have a first extreme actuating position in which it direct airflow only to the left side flow path 26, a second extreme actuating position in which it direct airflow only to the right side flow path 27, and one or more intermediate actuating positions in which it directs airflow to both the left and right side flow paths 26, 27, possibly with varying distribution. A flap valve corresponds for example to a valve having a pivotally mounted valve element in form of a door or the like that may be pivoted between two extreme positions for controlling the flow path in a three-way, or more, air duct junction.

Figure 7:
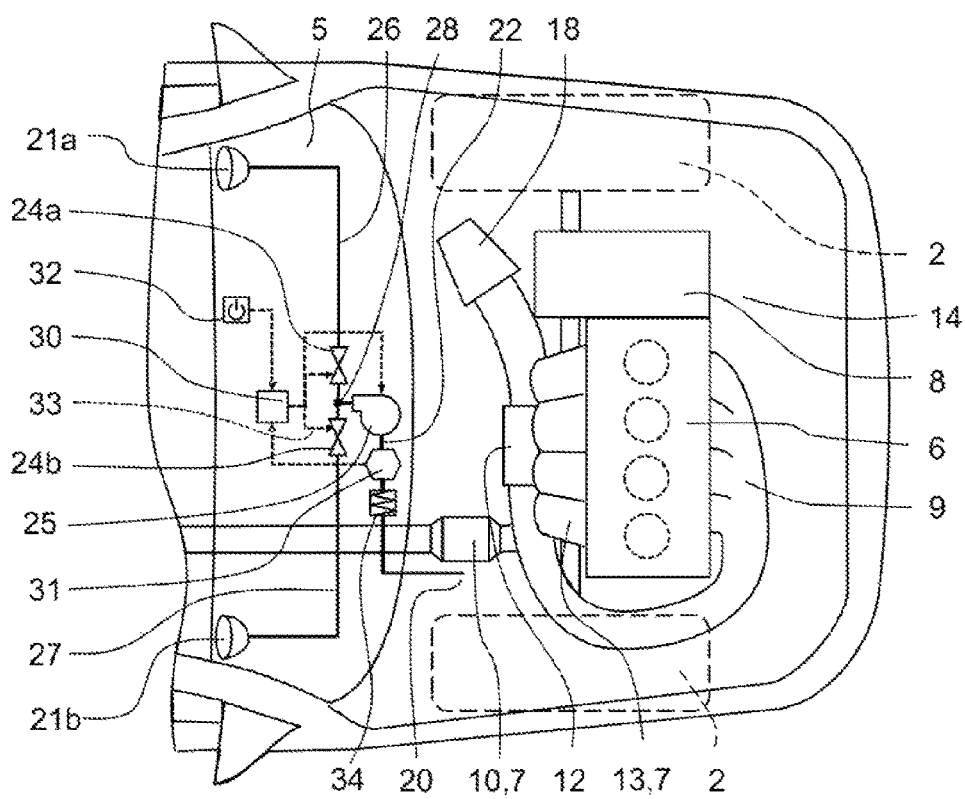
FIG. 7 shows yet a further schematic top view of a front part of the vehicle including another example embodiment of the air feeding system including an electronic controller.

A further difference between the example embodiments of FIGS. 6 and 7 is that the air quality sensor 31 is located within the flow path, upstream of the fan 25. However, the air quality filter may alternatively be located downstream of the fan 25 or within the passenger compartment. This applies to all example embodiments described within the disclosure. Moreover, an air filter 34 is also located within the flow path, upstream of the fan 25.

Still a further example embodiment of the air feeding system according to the disclosure is described with reference to FIG. 8, in which the air feeding system is implemented together with a conventional vehicle HVAC system. Thereby, it becomes more easy to use common air feeding air outlets 21, 21a, 21b for both the HVAC system and the air feeding system for supplying air with smell from a powertrain component, such that the overall cost and complexity of the vehicle is reduced. Moreover, the HVAC system and the air feeding system for supplying air with smell from a powertrain component may also share the fan 25, thereby further enabling reduced overall vehicle cost.

Specifically, the air feeding system may comprises a fresh air inlet 35 for sucking fresh exterior air into the air feeding system, and a HVAC unit 36 with a fan 25 located in a fresh airflow path extending between the fresh air inlet 35 and the air outlets 21, 21a, 21b, wherein the air duct arrangement includes a pipe segment 37 extending between the air inlet 20 and a low pressure region of the fresh airflow path located upstream of the fan 25 and configured for sucking air with smell associated with the component of the vehicle powertrain from the air inlet 20 into the HVAC unit 36 and further to the air outlets 21, 21a, 21b.

More in detail, the pipe segment 37 extends between the air inlet 20 and a connection point 38 located upstream of the fan 25 in the fresh airflow path extending between the fresh air inlet 35 and the air outlets 21, 21a, 21b.

The use of the fan or fans within the HVAC unit 36 for sucking air with smell associated with the component of the vehicle powertrain from the air inlet 20 into the HVAC unit 36 through the pipe segment 37 enables cost-efficient implementation of the vehicle air feeding system by sharing fan with the existing HVAC unit 36. Consequently, the vehicle air feeding system does require a further fan for pushing air with smell into the air inlet 20 of the pipe segment 37, in particular not use of the engine cooling fan for pushing air with smell into the air inlet 20 of the pipe segment 37, thereby enabling a less complex and more cost-efficient design.

A fresh air filter 34a may be located in the fresh airflow path, for example upstream of the connection point 38, because thereby an active carbon filter of the fresh air filter 34a does not negatively influence the smell of the air sucked in at the air inlet 20.

Moreover, a further air filter 34b may be located in said the pipe segment 37 extending between the air inlet 20 and the connection point 38 for filtering for example particles.

In addition, the air duct valve 24 for enabling selective opening and closing of the flow path extending from the air inlet 20 to the air outlet 21, 21a, 21b may also be located in the pipe segment 37 extending between the air inlet 20 and the connection point 38 because thereby closing of the air duct valve 24 does not influence the functionality of the fresh airflow path and the HVAC unit 36.

In the example embodiment of the air feeding system depicted in FIG. 8, an evaporator core 39 of an air conditioning system, a heater core 40 of an air heating system, and the first branch point 28 are located downstream of the fan 25, in that order.

In detail, airflow through the evaporator core 39 may for example be cooled and dried by the evaporator core 39, and subsequently conveyed to the heater core 40 via a heating air duct segment and a first air duct valve 41. Airflow through the heater core 40 may become heated by means of hot water or electric heaters, and thereafter conveyed via the heating air duct segment to the first branch point 28.

Meanwhile, if the driver or passenger does not want the air to become heated by the heater core 40, a bypass air duct including a second valve air duct valve 42 is branched off at a heater branch point 43 located upstream of the heater core 40, and subsequently joined to the first branch point 28 or the heating air duct segment downstream of the heater core 40. Hence, the first and second air duct valves 41, 42 may be selectively controlled by the electronic controller 30, or via mechanical actuating means such as one or more Bowden cables, for controlling the temperature of the air entering the passenger compartment.

Clearly, as discussed above with reference to FIG. 7, also the first and second air duct valves 41, 42 merely represent one alternative design of a valve arrangement for enabling selective individual opening and closing of the flow paths through the heating air duct segment and bypass air duct. For example, the first and second air duct valves 41, 42 and heater branch point 43 may be replaced by a single flap valve, which flap valve may control the distribution of air entering the heating air duct segment and bypass air duct.

Similarly, the valve arrangement for enabling selective individual opening and closing of the left side flow path 26 and right side flow path 27 may be similar to described with reference to FIG. 7, e.g. by means of left and right side valves 24a, 24b located on different sides of the first branch point 28, or by means of a single flap valve distributing the airflow between the left and right side flow paths 26, 27.

Still a further example embodiment of the air feeding system according to the disclosure is described with reference to FIG. 9, which shows only the air feeding system and not the vehicle or powertrain. This example embodiment enables implementation of the air feeding system into a HVAC system for providing a more integrated solution, which also uses the fan of the HVAC system for enabling airflow with smell from a component of the powertrain from the air inlet 20 to the air outlet 21, 21a, 21b. Thereby, the air feeding system is more cost-efficient because of dual use of fan and air ducts, i.e. both for normal ventilation purpose via HVAC system and air feeding of air with powertrain smell.

Specifically, the air duct arrangement comprises a fresh air branch point 44 located upstream of the fan 25 in the fresh airflow path and dividing the fresh airflow path into a left side fresh airflow path 45 extending between the fresh air branch point 44 and left side air outlet 21a and a right side fresh airflow path 46 extending between the fresh air branch point 44 and right side air outlet 21b, wherein the pipe segment 37 configured for sucking air with smell associated with the component of the vehicle powertrain from the air inlet into the HVAC unit includes a left side pipe segment 37a connected to the left side fresh airflow path 45, a right side pipe segment 37b connected to the right side fresh airflow path 46, and a valve arrangement 47 for controlling flow of air from the air inlet 20 to each of the left side fresh airflow path and right side fresh airflow path via said left and right side pipe segment, respectively.

As a result, the air feeding system provides individual control of ventilation air temperature and supply of air with smell from the powertrain to the driver and the passenger sitting next to the driver, while using common components for ventilation and air feeding from powertrain for saving cost.

The valve arrangement 47 may for example be a flap valve having a pivotally mounted valve element in form of a door or the like that may be pivoted between two extreme positions for controlling the flow distribution between the left and right side pipe segments 37a, 37b, or any other type of three-way valve, or two two-way valves, one located in each of the left and right side pipe segments 37a, 37b.

Similarly, the air feeding system comprise a left side valve arrangement 48 for enabling selective individual opening and closing of the flow paths through the heater core 40 and left side bypass air duct 50 of the left side fresh airflow path 45, and a right side valve arrangement 49 for enabling selective individual opening and closing of the flow paths through the heater core 40 and right side bypass air duct 54 of the right side fresh airflow path 46.

Also each of the left and right side valve arrangements 48, 49 may for example be implemented in form of a flap valve having a pivotally mounted valve element in form of a door or the like that may be pivoted between two extreme positions for controlling the flow distribution between the heater core 40 and bypass air duct 50, 51, or any other type of three-way valve, or two two-way valves, one located in the duct of the heater core 40 and one in the bypass air duct 50, 51.

The air feeding system may further comprise left and right side valves 24a, 24b located in the left and right side fresh airflow paths 45, 46, respectively, and configured for enabling selective individual opening and closing of the left and right side fresh airflow paths 45, 46, respectively. Said left and right side valves 24a, 24b may for example be located downstream of the heater core 40.

Figure 9:
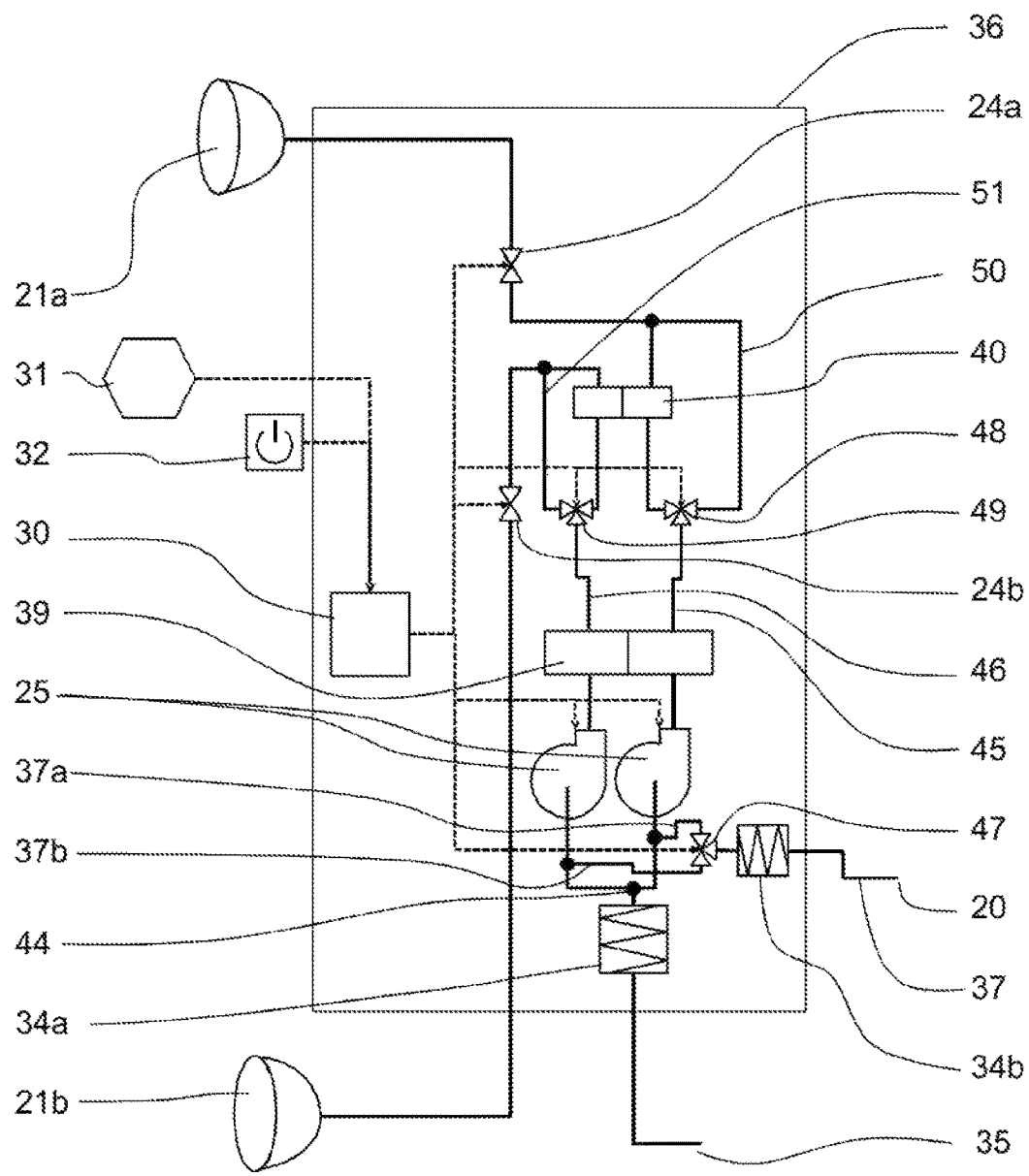
FIG. 9 shows a further schematic top view of a front part of the vehicle including yet another example embodiment of the air feeding system, here integrated with a HVAC system and with a common fan.

The fan 25 is schematically illustrated as two fans in FIG. 9 but the fan may be implemented by a single fan having some type of partition wall for enabling two separated flow paths, i.e. one for the left side fresh airflow path 45 and one for the right side fresh airflow path 46. Similarly, each of the evaporator core 39 and heater core 40 are preferably mounted in a duct housing having partition wall for enabling two separated flow paths through each of the evaporator core 39 and heater core 40 for the same reasons.

Common for all embodiments of the air feeding system for introducing air with smell associated with a component 6-13 of a vehicle powertrain into a vehicle passenger compartment 4 described with reference to FIGS. 8 and 9 is that operation of the vehicle air feeding system may be controlled independently from operation of an air heating system of the passenger cabin. In other words, the control of the flow of air that is sucked in to the pipe segment 37 at the air inlet 20 located adjacent a certain component 6-13 of a vehicle powertrain, and subsequently supplied at the air outlet 21, 21a, 21b within the passenger compartment is performed independent from the air temperature within engine compartment, air temperature outside of vehicle, air temperature within passenger compartment, and/or engine coolant temperature. Thereby, a driver may for example activate the vehicle air feeding system involving supply of air with smell from the engine bay to the passenger compartment for enjoying a more intuitive experience of the operating state of the powertrain and/or a greater emotional feeling of contact with the powertrain also when driving on a warm day.

In practice, this independent control of the vehicle air feeding system relative to the control of the vehicle heating system is accomplished by appropriate control of the air duct valves 24, 41, 42, with reference to the embodiment of FIG. 8, and valve arrangements 47, 48, 49, with reference to the embodiment of FIG. 9.

For example, with reference to FIG. 8, control of the supply of air with smell is accomplished by means of the air duct valve 24 mounted in the pipe segment 37 extending between the air inlet 20 and a low pressure region of the fresh airflow path located upstream of the fan 25, and the control of the temperature of the air entering the passenger compartment is accomplished by means of the first and second air duct valves 41, 42, which jointly control the distribution of air entering the heating air duct segment and bypass air duct. Consequently, by controlling the setting of the air duct valve 24 of the pipe segment 37 independent from the control setting of the first and second air duct valves 41, 42, operation of the vehicle air feeding system may be controlled independently from operation of an air heating system of the passenger cabin.

Similarly, with reference to FIG. 9, control of the supply of air with smell is accomplished by means of the valve arrangement 47 for controlling flow of air from the air inlet 20 to each of the left side fresh airflow path 45 and right side fresh airflow path 46, and the control of the temperature of the air entering the passenger compartment is accomplished by means of the left and right side valve arrangements 48, 49, which control the distribution of air entering the heater core 40 and left side bypass air duct 50 and right side bypass air duct 54, respectively. Consequently, by controlling the setting of the valve arrangement 47 associated with the pipe segment 37 independent from the control setting of the left and right side valve arrangements 48, 49, operation of the vehicle air feeding system may be controlled independently from operation of an air heating system of the passenger cabin.

It is thus clear that the air duct valve 24 or valve arrangement 47 arranged in the pipe segment 37 associated with the air inlet 20 located adjacent a certain component 6-13 of a vehicle powertrain, as described with reference to the embodiments of FIGS. 8 and 9, may only control the air flow through the pipe segment 37 from the air inlet 20 to the HVAC unit 36, and not air flow through the pipe segment 37 from the air inlet 20 to another part or region outside of the HVAC unit 36.

Common for all embodiments of the vehicle air feeding system described herein is also that the air duct arrangement 22 provides a closed flow path from the air inlet 20 to the air outlet 21. In other words, the flow path is a sealed flow path from the air inlet 20 in the vehicle engine bay 14 to the air outlet 21 in the vehicle passenger compartment 4, possibly including one or more valves, air filters, heater cores, fans, evaporator cores 39, but without any intermediate openings where air with smell associated with the component of the vehicle powertrain can escape to outside of the vehicle. Consequently, by means of the sealed flow path, a sufficiently high concentration of air smell associated with the component of the vehicle powertrain may be supplied to the passenger compartment 4 for providing the desired racing atmosphere or environment.

Figure 10:
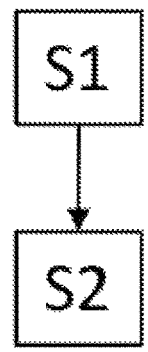
FIG. 10 is a schematic overview of the various steps of a method for introducing air with smell associated with a component of a vehicle powertrain into a vehicle passenger compartment.

The present disclosure also relates to a method for introducing air with smell associated with a component of a vehicle powertrain into a vehicle passenger compartment 4. The method is hereinafter described with reference to FIG. 10 and comprises a first step S1 of providing an air duct arrangement 22 having an air inlet 20 located adjacent the component of the powertrain and an air outlet 21 located in the vehicle passenger compartment 4, and a second step S2 of guiding air with smell associated with the component of the vehicle powertrain from the air inlet 20 to the air outlet 21.

Although the disclosure has been described in relation to specific combinations of components, it should be readily appreciated that the components may be combined in other

What is claimed is:

1. A vehicle comprising a vehicle air feeding system for introducing air with a smell associated with a component of a vehicle powertrain into a vehicle passenger compartment, wherein the vehicle is a car, and wherein the vehicle air feeding system comprises:
    an air inlet located adjacent the component of the powertrain,
    an air outlet located in the vehicle passenger compartment, and
    an air duct arrangement providing a flow path from the air inlet to the air outlet and configured for guiding air with the smell associated with the component of the vehicle powertrain from the air inlet to the air outlet,
    wherein the vehicle air feeding system further comprises an electronic controller for controlling an airflow through the flow path, wherein the electronic controller is configured for at least one of:
        obtaining a vehicle speed and automatically generating airflow from the air inlet to the air outlet when the vehicle speed is larger than a threshold value,
        providing a time-varying spiritual driving index and automatically generating airflow from the air inlet to the air outlet when the spiritual driving index is larger than a threshold value,
        detecting a vehicle driving mode and automatically generating airflow from the air inlet to the air outlet when a vehicle sport mode or a vehicle race mode is selected, or
        obtaining a twisty road index associated with a road on which the vehicle is driven and a current location of the vehicle, and automatically generating airflow from the air inlet to the air outlet when the twisty road index is larger than a threshold value.

2. The vehicle according to claim 1, wherein the vehicle air feeding system further comprises an air duct valve for enabling selective opening and closing of the flow path.

3. The vehicle according to claim 1, wherein the vehicle air feeding system further comprises a fan mounted within the flow path for enabling forced airflow from the air inlet to the air outlet.

4. The vehicle according to claim 1, wherein the vehicle air feeding system comprises a left side air outlet located adjacent a left side of the vehicle passenger compartment, and a right side air outlet located adjacent a right side of the vehicle passenger compartment, wherein the flow path includes a left side flow path from the air inlet to the left side air outlet and a right side flow path from the air inlet to the right side air outlet.

5. The vehicle according to claim 4, wherein the vehicle air feeding system further comprises a valve arrangement for enabling selective individual opening and closing of the left side flow path and the right side flow path.

6. The vehicle according to claim 1, wherein the vehicle air feeding system further comprises an electronic controller for controlling an airflow through the flow path, and an air quality sensor located within the passenger compartment or within the flow path or adjacent the air inlet, and wherein the electronic controller is configured to prevent airflow through the flow path when an air quality is below a threshold value.

7. The vehicle according to claim 1, wherein the vehicle air feeding system further comprises a fresh air inlet for sucking fresh exterior air into the air feeding system, and a HVAC unit with a fan located in a fresh airflow path extending between the fresh air inlet and the air outlet, wherein the air duct arrangement includes a pipe segment extending between the air inlet and a low pressure region of the fresh airflow path located upstream of the fan and configured for sucking air with smell associated with the component of the vehicle powertrain from the air inlet into the HVAC unit and further to the air outlet.

8. The vehicle according to claim 7, wherein the air duct arrangement further comprises a fresh air branch point located upstream of the fan in the fresh airflow path and dividing the fresh airflow path into a left side fresh airflow path extending between a fresh air branch point and left side air outlet and a right side fresh airflow path extending between the fresh air branch point and right side air outlet, wherein the pipe segment configured for sucking air with the smell associated with the component of the vehicle powertrain from the air inlet into the HVAC unit includes:
    a left side pipe segment connected to the left side fresh airflow path,
    a right side pipe segment connected to the right side fresh airflow path, and
    a valve arrangement for controlling flow of air from the air inlet to each of the left side fresh airflow path and right side fresh airflow path via said left and right side pipe segments, respectively.

9. The vehicle according to claim 1, wherein the component of the vehicle powertrain is a combustion engine exhaust manifold, a combustion engine exhaust system, an exhaust system catalytic converter, an exhaust muffler, a combustion engine super charger, a combustion engine turbo charger, a friction clutch, an engine block, an electric propulsion motor, or a high-voltage propulsion battery pack.

10. The vehicle according to claim 1, wherein the component of the vehicle powertrain is a hot component during operation of the powertrain.

11. The vehicle according to claim 1, wherein the air inlet is located less than 40 cm from the component of the powertrain, and without any partition or shielding wall between the air inlet and the component of the powertrain.

12. The vehicle according to claim 1, wherein the air inlet is located in a vehicle engine bay.

13. The vehicle according to claim 1, wherein the air inlet is located less than 10 cm from the component of the powertrain, and without any partition or shielding wall between the air inlet and the component of the powertrain.

14. A method for introducing air with a smell associated with a component of a vehicle powertrain into a vehicle passenger compartment of a car, comprising:
    providing an air duct arrangement having an air inlet located adjacent the component of the powertrain and an air outlet located in the vehicle passenger compartment of the car,
    guiding air with the smell associated with the component of the vehicle powertrain along a flow path from the air inlet to the air outlet, including controlling an airflow through the flow path with an electronic controller, wherein the electronic controller is configured for at least one of:
        obtaining a vehicle speed and automatically generating airflow from the air inlet to the air outlet when the vehicle speed is larger than a threshold value, providing a time-varying spiritual driving index and automatically generating airflow from the air inlet to the air outlet when the spiritual driving index is larger than a threshold value, detecting a vehicle driving mode and automatically generating airflow from the air inlet to the air outlet when a vehicle sport mode or a vehicle race mode is selected, or obtaining a twisty road index associated with a road on which the vehicle is driven and a current location of the vehicle, and automatically generating airflow from the air inlet to the air outlet when the twisty road index is larger than a threshold value.

\* \* \* \* \*